United States Patent

[11] 3,575,464

| [72] | Inventors | John Himka<br>Farmington;<br>Ronald A. Niewolak, Warren, Mich. |
|---|---|---|
| [21] | Appl. No. | 861,707 |
| [22] | Filed | Sept. 29, 1969 |
| [45] | Patented | Apr. 20, 1971 |
| [73] | Assignee | General Motors Corporation<br>Detroit, Mich. |

[54] FOLLDING RETRACTABLE HARD TOP
6 Claims, 6 Drawing Figs.

| [52] | U.S. Cl. | 296/117 |
|---|---|---|
| [51] | Int. Cl. | B60j 7/12 |
| [50] | Field of Search | 296/107, 108, 116, 117 |

[56] References Cited
UNITED STATES PATENTS

| 2,704,225 | 3/1955 | Anschuetz et al. | 296/116 |
|---|---|---|---|
| 3,271,067 | 9/1966 | Rollman | 296/116 |
| 3,347,592 | 10/1967 | Renneker | 296/107 |

*Primary Examiner*—Kenneth H. Betts
*Assistant Examiner*—Robert R. Song
*Attorneys*—Warren E. Finken and F. J. Fodale ABSTRACT: An automobile body having a three-section, hard top roof is disclosed. The front two sections are movable to a stored position in the rear shelf area of the passenger compartment providing an open sun roof.

PATENTED APR 20 1971

INVENTORS
John Himka, &
Ronald A. Niewolak
BY
F. J. Fodale
ATTORNEY

INVENTORS
John Himka, &
Ronald A. Niewolak
BY F.J. Fodale
ATTORNEY

FOLLDING RETRACTABLE HARD TOP

This invention relates generally to convertible tops for automobile bodies and more specifically to hardtops convertible between a closed roof sedan configuration and an open sun roof sedan configuration.

Many schemes to provide alternate automobile body types have been heretofore proposed. The most popular among these are the conventional fabric convertible top and the completely removable or storable hard top. Included also is the sun roof automobile in which a portion of the passenger compartment roof usually over the front seat is removable to expose the passengers to the sun.

Broadly, my invention is directed to providing an automobile having a hardtop roof providing a closed roof sedan which is convertible to an open sun roof sedan by moving the total forward section of the roof to a stored position within the body of the automobile.

Another object of my invention is to provide an automobile having a hardtop roof which is convertible between a closed roof sedan configuration and an open sun roof sedan configuration wherein the rear section of the roof is in the same position in either configuration and wherein the forward section is s stored within the body of the automobile generally below the belt line of the automobile body.

Another object of my invention is to provide a convertible hardtop in which the front section of the roof is stored to provide an open sun roof configuration; the front section being stored within the general rear shelf area of the passenger compartment. Another object of my invention is to provide a convertible hardtop roof in which the front section of the roof is stored in approximately the same area required by a conventional soft top convertible.

Another object of my invention is to provide such a hardtop convertible in which the rear section of the roof is in a normal raised position to provide a roll bar function when the front section of the roof is so stored.

Another object of my invention is to provide such a convertible hardtop in which the front section is in two portions which fold over to minimize the storage area required for the sun roof configuration.

Another object of my invention is to provide a convertible hardtop roof in which the forward and rearward sections of the roof are each independently pivotally mounted to the body so that the front section can be conveniently stored with the rear section being returnable to a normal operative position to provide an hardtop body with open sun roof configuration.

Other objects and advantages of the invention will hereinafter become more fully apparent from the following description of the annexed drawings, which illustrate a preferred embodiment, and wherein:

FIG. 1 is a side view of the roof and adjacent body portions of an automobile body in accordance with my invention. In FIG. 1, the roof is shown in a closed sedan configuration.

FIG. 2 is a view similar to FIG. 1 showing the rear section of the roof temporarily raised preparatory to the front section of the roof being moved to a stored position.

Figure 3:
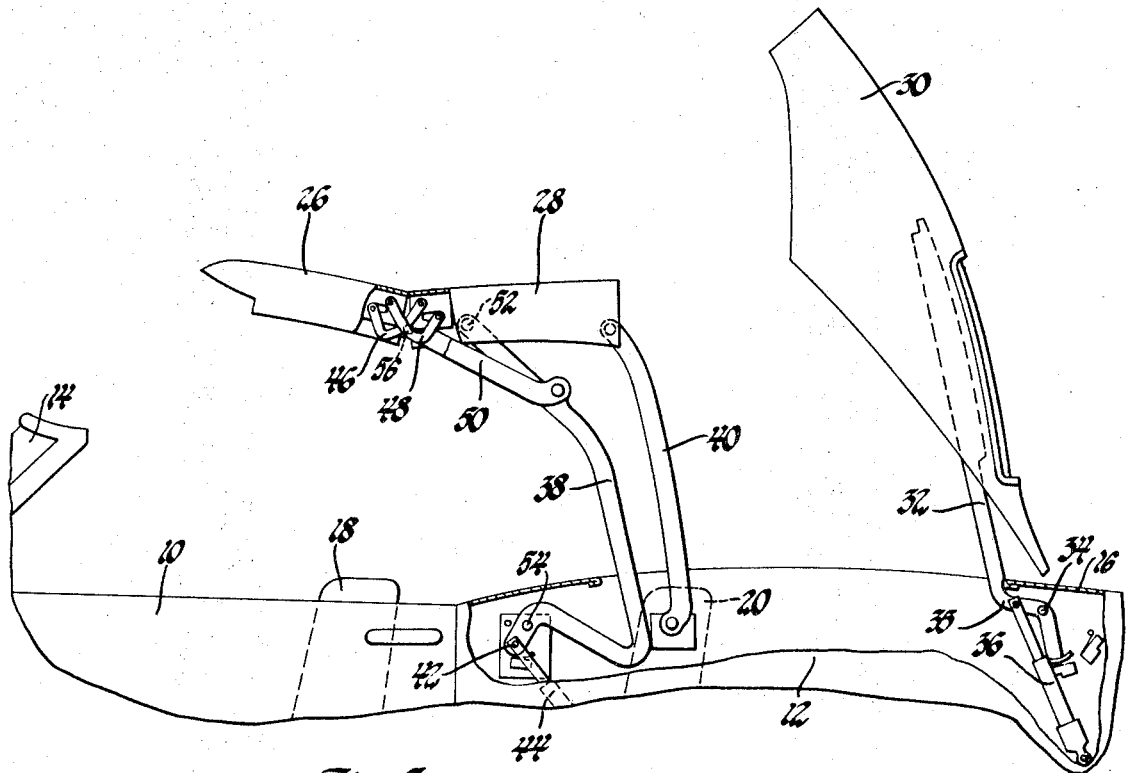
FIG. 3 is a view similar to FIGS. 1 and 2 and shows the front section of the roof after it has started movement toward its stored position.

Referring now to the drawings and more specifically to FIG. 1, the portion of the two-door automobile body illustrated is generally that of the passenger compartment which includes the doors 10, the body side panels 12, the windshield 14, and the rear deck tulip panel 16. The passenger compartment includes a front seat 18, a rear seat 20, and what is normally regarded as a rear shelf area 22 behind the rear seat 20. The passenger compartment is covered by a roof indicated generally at 24 which extends from the tulip panel 16 to the windshield 14. The roof 24 is a hardtop roof and comprises three section 26, 28, and 30 which alternately form the closed sedan configuration shown in FIG. 1 or the open sun roof sedan configuration shown in FIG. 6. The various positions of the roof sections 26, 28, and 30 and their controlling linkages during the transition from the closed roof sedan configuration shown in FIG. 1 to the open sun roof sedan configuration shown in FIG. 6 is illustrated in FIGS. 2, 3, 4, and 5.

Referring now to FIG. 2, the rear section 30 is secured to a lever arm 32 which is pivotally mounted to the side panel 12 at 34. While throughout the description reference will be made to a single side panel 12 and the single side of the control mechanism, such as a single lever arm 32, it is to be understood that in actuality two side panels and two such lever arms 32 are contemplated; one on each side of the automobile passenger compartment. The lever arm 32 has an offset pivot 35 so that the hydraulic cylinder 36 which is pivotally mounted to it and to the side panel 12 produces a moment on the lever arm whereby extension of the hydraulic cylinder raises the rear section 30 from the position shown in FIG. 1 to the raised position shown in FIG. 2. The raised position of the rear section 30 shown in FIG. 2 is a temporary position wherein the rear section 30 of the roof 24 is moved out of the path of the sections 26 and 28 as they are moved from their closed roof sedan configuration shown in FIGS. 1 and 2 to their stored position shown in FIG. 6. Alternately, the sections 26 and 28 may be referred to as the front and rear portions of the front section of the roof 24 or merely referred to as the front and intermediate sections of the roof 24. The control linkage for the front and intermediate sections 26 and 28, respectively, is best understood in reference to FIG. 3 which shows the sections in transitory position between their closed sedan position and their stored position.

The intermediate roof section 28 is movably mounted on the sidewall 12 by a parallel linkage system comprising a forward link 38 and a rearward link 40, each of which are pivotally mounted both to the intermediate section 28 and to the side panel 12. The side panel 12, the intermediate roof section 28, and the parallel links 38 and 40 form a parallel linkage system by which the intermediate roof section 28 is movable from the normal operating position shown in FIGS. 1 and 2 to the stored position shown in FIG. 6 in an arcuate path with the intermediate roof panel 28 maintaining a substantially constant attitude during this arcuate movement relative to the side panel 12. Of course, there are two side panels 12 and two sets of parallel links 38—40 involved, one for each side of the passenger compartment. The forward link 38 includes an offset pivot 42 by which a second hydraulic cylinder 44 produces a moment on the link 38. As the cylinder 44 is extended, the link 38 is rotated clockwise controlling movement of the panel linkage system swinging the intermediate roof panel 28 in a clockwise arcuate sweep.

The forward section 26 of the roof 24 is hinged to the intermediate roof section 28 by means of a pair of hinges 46 and 48. The hinge 46 is pivotally mounted to the forward end of the intermediate section 28 while being pivotally mounted in a slide in the rearward end of the forward section 26. Contrarily, the hinge 48 is pivotally mounted to the rear end of the forward section 26 with the opposite end of the hinge 48 being pivotally mounted in a slide in the forward end of the intermediate section 28. This hinge arrangement allows the confronting end faces of the forward section 26 and intermediate section 28 to abut when in the closed sedan configuration shown in FIG. 1 and allows the forward section 26 to overlie the intermediate section 28 in the stored position shown in FIG. 6. The forward section 26 rotates clockwise with respect to the intermediate section 28 between these two extreme positions as is evident by a comparison of FIGS. 3, 4, and 5.

Figure 4:
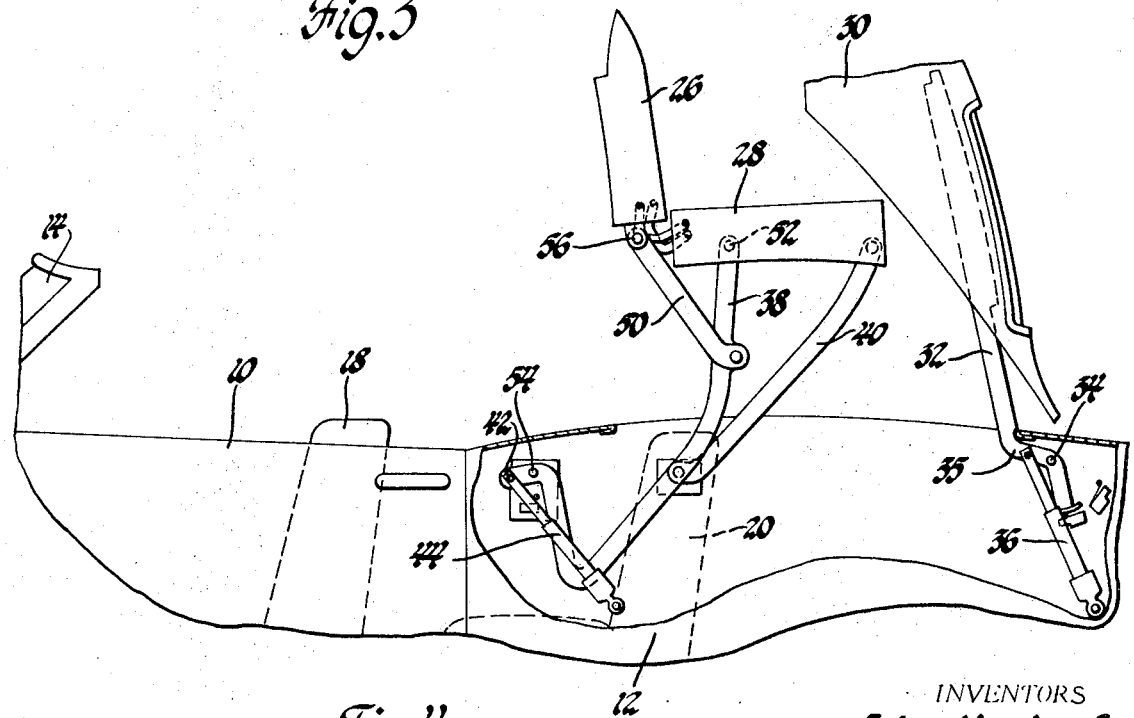
FIG. 4 is a view similar to FIGS. 1—3 and shows the front section of the roof in a position further toward its stored position.

As best shown in FIG. 4, a follower link 50 is pivotally mounted to the forward parallel link 38 intermediate its pivot point 52 on the intermediate roof section 28 and its pivot point 54 on the sidewall 12. The follower link 50 is also pivotally mounted at 56 to the forward roof section 26 at such a position so as to produce a moment on the forward roof section 26 about its effective hinge point determined by the hinges 46—48. It is the follower link 50 powered from the forward link 38 which causes the forward roof section 26 to rotate clockwise into the intermediate roof section 28 concurrently with the intermediate roof section 28 being swung arcuately to its stored position by its parallel linkage system.

Figure 5:
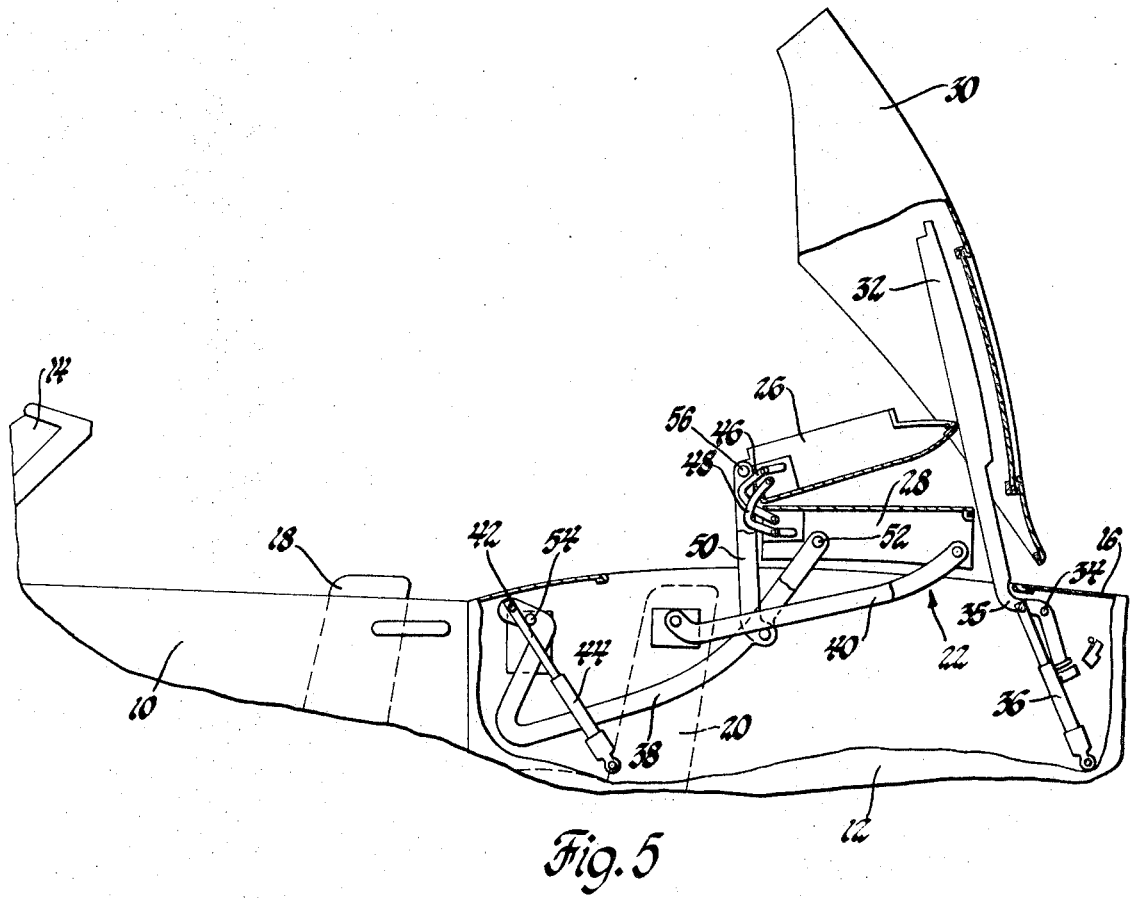
FIG. 5 is a view similar to FIGS. 1—4 showing the forward section of the roof almost to its stored position in the rear shelf area of the passenger compartment.
Figure 6:
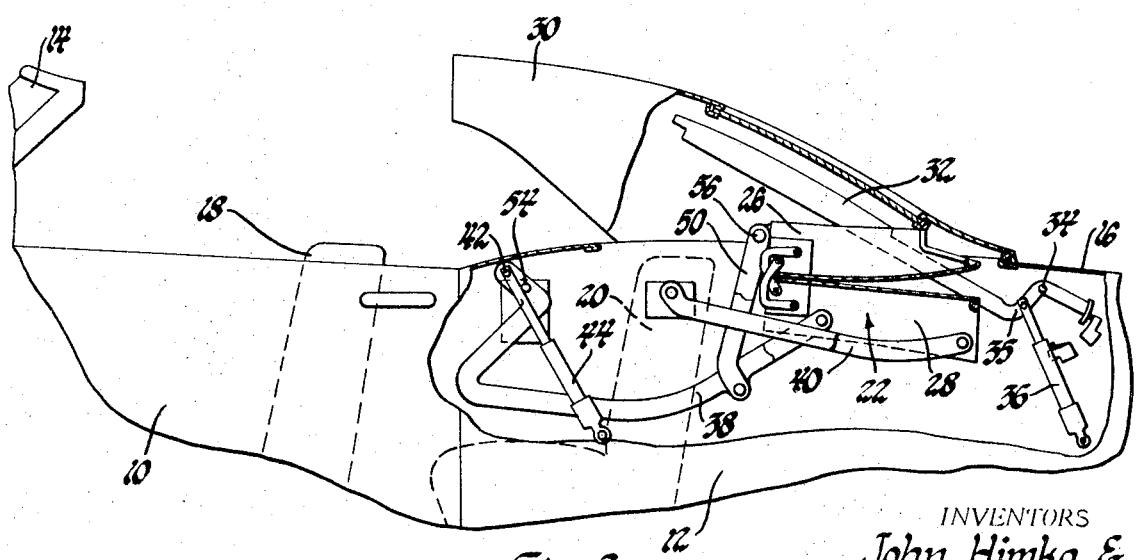
FIG. 6 is a view similar to FIGS. 1—5 and shows the open sun roof configuration wherein the forward section of the roof is stored in the rear shelf area of the passenger compartment and the rear section of the roof returned to its normal operating position.

Referring now to FIG. 5, the forward and intermediate roof sections 26 and 28, respectively, are nearly overlapping and parallel as they approach a stored position in the rear shelf area 22 behind the rear passenger seat 20.

In FIG. 6, the forward roof section 26 completely overlies the intermediate roof section 28 thereby requiring a minimum of space in its stored position in the rear shelf area 22 behind the rear passenger seat 20. The rear roof section 30 is returned to its normal operating position where it substantially covers the rear seat portion of the passenger compartment and provides a roll bar for the automobile body.

While during the previous description, reference has been made to the hydraulic cylinders 36 and 44, it is to be understood that the roof may be operated manually as well as through power sources other than hydraulic cylinders. It is also to be understood that both totally separate or coordinated movements of the front, intermediate, and rear sections are contemplated. In other words, the movements of the rear roof section 30 can be distinct from the movements of the forward and intermediate sections 26 and 28, respectively, as described or these sections when powered can be coordinated. That is, the movement of the forward and intermediate sections 26 and 28 can be initiated prior to the rear section being completely raised and the lowering of the rear section 30 might be initiated prior to complete storage of the forward and rear sections 26 and 28, respectively, in the rear shelf area 22 of the passenger compartment.

I wish it to be understood that I do not desire to be limited to the exact details of construction shown and described, for obvious modifications will occur to a person skilled in the art.

We claim:

1. In an automobile body having a windshield, rear deck and an interposed passenger compartment with a front seat and a rear seat, a hard top roof convertible between a closed roof sedan configuration and an open sun roof sedan configuration, said roof comprising:
    a rear roof section substantially covering the rear seat portion of said passenger compartment in its normal operative position;
    means pivotally mounting said rear roof section to said body whereby said rear roof section is movable between its normal operative position and a raised temporary position;
    a front roof section extending from said rear roof section to said windshield and covering said front seat portion of said passenger compartment in its normal operative position; and
    parallel linkage means swingable mounting said front roof section to said body whereby said front roof section is movable between said normal operative position and a stored position whereby an open sun roof is provided when said front roof section is stored and said rear roof section is in its normal operative position and a closed roof is provided when both said roof sections are in their respective normal operative positions.

2. The combination as defined in claim 1 wherein said parallel linkage means is pivotally mounted on said body rearwardly of said front seat and wherein front roof section is located behind said rear seat when in its stored position.

3. The combination as defined in claim 1 wherein said front roof section comprises a front portion and a rear portion and hinge means connecting said portions together at their interface and wherein said parallel linkage means pivotally mounts said rear portion of said front section to said body.

4. The combination as defined in claim 3 wherein said parallel linkage means is pivotally mounted on said body rearwardly of said front seat and further including link means connected to said parallel linkage means and to said front portion of said front section, said link means pivoting said front portion about said hinge means as said rear portion is moved to said stored position whereby said front roof section is located behind said rear seat in its stored position with said front portion overlying said rear portion of said front section.

5. A convertible hardtop roof for an automobile body having a windshield, rear deck and an interposed passenger compartment with a seat, said roof comprising:
    a front section, an intermediate section and a rear section;
    means hingedly connecting said front section to said intermediate section;
    parallel linkage means pivotally connected to said intermediate section and to said body rearwardly of said intermediate section whereby said front and intermediate sections are movable between a raised operative position and a lowered stored position beneath said rear section;
    link means operatively connected to said parallel linkage means and to said front section, said link means concurrently rotating said front section to a position overlying said intermediate section as said front and intermediate sections are moved to a lowered stored position; and
    means pivotally mounting said rear section to said body, said rear section being temporarily pivoted to a raised position as said front and intermediate sections are moved from their raised operative position to their lowered stored position, said rear section being subsequently lowered to provide a roll bar for said passenger compartment.

6. In an automobile body having a windshield, a rear deck, and an interposed passenger compartment with a front seat and a rear seat and a hard top roof extending from said windshield to said rear deck and covering said passenger compartment in one of its operative positions providing a closed sedan and covering only the rear seat portion of said passenger compartment in another of its operative positions providing an open sun roof sedan, the combination comprising:
    a front roof section having a front portion and a rear portion;
    a pair of parallel links pivotally connected to each side wall of said passenger compartment and to said rear portion of said front roof section whereby said rear portion is movable from an operative position to a stored position behind said rear seat with a substantially constant attitude;
    power means operatively connected to one of said parallel links in each pair for operating said pairs of parallel links;
    hinge means connecting the rear of said front portion to the front of said rear portion;
    a follower link pivotally connected to the forward of said parallel links in each pair intermediate its pivots and to said forward portion whereby said forward portion is pivoted about said hinge means to a position overlying said rear portion as said rear portion is moved from an operative position to a stored position;
    a rear roof section;
    a lever pivotally connected to each side wall of said body rearwardly of said parallel link pivots and secured to said rear roof section; and
    second power means operatively connected to said levers for raising said rear section temporarily as said front section is moved between its positions.